United States Patent
Skatter

(10) Patent No.: US 7,366,281 B2
(45) Date of Patent: Apr. 29, 2008

(54) SYSTEM AND METHOD FOR DETECTING CONTRABAND

(75) Inventor: Sondre Skatter, Oakland, CA (US)

(73) Assignee: GE Invision Inc., Newark, CA (US)

( * ) Notice: Subject to any disclaimer, the term of this patent is extended or adjusted under 35 U.S.C. 154(b) by 321 days.

(21) Appl. No.: 10/838,968

(22) Filed: May 4, 2004

(65) Prior Publication Data

US 2006/0165217 A1    Jul. 27, 2006

Related U.S. Application Data

(60) Provisional application No. 60/519,727, filed on Nov. 12, 2003.

(51) Int. Cl.
*G01N 23/04* (2006.01)

(52) U.S. Cl. ......................... 378/57; 340/531

(58) Field of Classification Search .................. 378/57, 378/54, 181; 702/81–84, 40; 340/522, 551, 340/531, 532, 506, 535, 534, 528; 73/865.8
See application file for complete search history.

(56) References Cited

U.S. PATENT DOCUMENTS 5,367,552 A * 11/1994 Peschmann .................. 378/57

| | | | |
|---|---|---|---|
| H2110 H * | 10/2004 | Newman | 340/572.4 |
| 7,106,192 B2 * | 9/2006 | Johnson et al. | 340/540 |
| 2003/0058102 A1 * | 3/2003 | Kimmet | 340/540 |
| 2003/0085808 A1 * | 5/2003 | Goldberg | 340/531 |
| 2003/0210139 A1 * | 11/2003 | Brooks et al. | 340/531 |
| 2004/0252024 A1 * | 12/2004 | Huey et al. | 340/540 |
| 2005/0237180 A9 * | 10/2005 | Boesch et al. | 340/531 |

FOREIGN PATENT DOCUMENTS

| EP | 0 825 457 A2 | 2/1998 |
|---|---|---|
| EP | 0825457 A2 * | 2/1998 |
| WO | WO 03/029844 A2 | 4/2003 |

* cited by examiner

*Primary Examiner*—Hoon Song
(74) *Attorney, Agent, or Firm*—GE Global Patent Operation; Jonathan E. Thomas

(57) ABSTRACT

According to one aspect of the invention, a contraband detection apparatus is provided and a method of detecting contraband are provided. A container is scanned with a first type of contraband detection apparatus. Based on results of the first scan, a plurality of risk values, which correspond to particular types of contraband, are generated. The container is then scanned with a second type of contraband detection apparatus. Based on the results of the second scan, the risk values are modified. If the combined risk values are above a predetermined value, an alarm is triggered.

28 Claims, 6 Drawing Sheets

26

| PERSON | THREAT STATE |
|---|---|
| Person 1 | 10% |
| Person 2 | 15% |
| Person 3 | 5% |
| Person 4 | 1% |

SYSTEM AND METHOD FOR DETECTING CONTRABAND

CROSS-REFERENCE TO RELATED APPLICATIONS

The present patent application claims priority from provisional patent application No. 60/519,727, filed on Nov. 12, 2003, which is incorporated herein by reference in its entirety.

BACKGROUND OF THE INVENTION

1). Field of the Invention

This invention relates to a system and method for detecting contraband.

2). Discussion of Related Art

In recent years, the detection of contraband, such as explosives, being transported in luggage and taken onto various means of transportation has become increasingly important. Advanced Explosive Detection Systems (EDSs) have been developed that can not only see the shapes of the articles being carried in the luggage but can also determine whether or not the articles contain explosive materials.

These detection systems include computed tomography (CT) machines. There are also explosive detection devices (EDDs) based on other technologies such as quadrapole resonance (QR). EDDs differ from EDSs in that the former cannot find the whole range of explosives as specified by the Transportation Security Administration (TSA). The EDDs and/or EDSs are typically manufactured by different companies and compute results in a way unrelated to each other.

To improve the performance of explosive detection systems, one approach is to combine multiple systems. In order to fuse the data from the different systems in a meaningful way, a tedious process of collecting joint data, designing a tailored data fusion algorithm, and subsequently tuning this algorithm is required. Additionally, in order for one to be able to accomplish this, he or she may have a very intimate knowledge of how each of the EDDs and EDSs work.

SUMMARY OF THE INVENTION

The invention provides a method that can be adopted by existing and new systems for detecting contraband. In this method, a system, or risk assessment agent, comprises a contraband detection apparatus or another computerized processor that assesses risk. The risk assessment agent will receive input data in the form of risk values, each risk value is indicative of the presence of a particular type of contraband. Furthermore the system will utilize its risk assessment (i.e. scanning results) to modify the risk values according to a given calculus and provide these modified risk values on output.

Because the calculus is an objective standard based on probability theory, the risk values will be a common language that allows systems to work together. without knowing about one another. When two systems are joined together, the second system will use the output risk values of the first system as input risk values. Thus this is a form of decentralized or distributed data fusion where there is no central data fusion entity.

The invention provides a method for detecting contraband comprising scanning a container with a first type of contraband detection apparatus, based on results of said scanning with the first type of contraband detection apparatus, generating a plurality of preliminary risk values, each preliminary risk value indicative of the presence of a respective type of contraband, scanning the container with a second type of contraband detection apparatus, and based on results of said scanning with the second type of contraband detection apparatus, modifying the preliminary risk values to generate a plurality of final risk values, each final risk value corresponding to a respective one of the preliminary risk values and indicative of the presence of a respective type of contraband.

The risk values may be on a scale from 0 to 100 percent, or 1 to 99 percent.

The risk calculus may be Bayesian probability theory wherein the initial risk values are prior probabilities of the presence of each type of contraband, the probabilities are modified using Bayes' rule with the likelihood of the scanning results given the presence of the various contraband types, and the output probabilities are the posterior probabilities.

Other calculi such as Dempster-Schafer theory can also yield equivalent results. A strength of using Bayesian probability is its simplicity, which is an advantage when applying the method as a standard.

The decentralized data fusion relies on the assumption that the systems are orthogonal or near-orthogonal, i.e. conditionally independent. This is usually fulfilled when technologies are used that measure different physical properties or independent sources of information are used.

The method may further comprise entering information of a person taking the container for loading into a loading bay of a craft and based on the information, generating a personal risk value, said generating of the plurality of intermediate risk values being based on the personal risk value and the results of said scanning with the first type of contraband detection apparatus.

The method may further be extended to a risk assessment agent that uses non-sensor information such as passenger information or general threat alert state to modify the risk values.

The method may further comprise triggering an alarm based on at least one of the final risk values.

The first type of contraband detection apparatus may be a CT scanner, and the second type of contraband detection apparatus may be a QR scanner. The scanning with the CT scanner may take place before said scanning with the QR scanner.

The invention also provides a method for detecting contraband comprising entering information of a person taking a container for loading into a loading bay of a craft, based on the information, generating a personal risk value, scanning the container with a first contraband detection apparatus, and based on the personal risk value and results of said scanning, generating at least a preliminary risk value.

The method may further comprise scanning the container with a second contraband detection apparatus and based on results of said scanning with the second contraband detection apparatus, modifying the preliminary risk value to generate a final risk value.

The method may further comprise triggering an alarm based on the final risk value.

The first contraband detection apparatus may be a CT scanner, and the second contraband detection apparatus may be a QR scanner. The scanning with the CT scanner may take place before said scanning with the QR scanner.

The invention further provides a method for detecting contraband comprising scanning a container with a first contraband detection apparatus, based on results of said scanning with the first contraband detection apparatus, generating an preliminary risk value on a scale from 1 to 99 percent, scanning the container with a second contraband detection apparatus, and based on the preliminary risk value and results of said scanning with the second contraband detection apparatus, generating a final risk value.

The method may further comprise entering information of a person taking a container for loading into a loading bay of a craft and based on the information, generating a personal risk value, said generating of the preliminary risk value being based on the personal risk value and the results of said scanning with the first contraband detection apparatus.

The method may further comprise triggering an alarm based on the final risk value.

The first contraband detection apparatus may be a CT scanner, and the second contraband detection apparatus may be a QR scanner. The scanning with the CT scanner may take place before said scanning with the QR scanner.

The invention further provides a method for detecting contraband comprising scanning a container with a first contraband detection apparatus, based on results of said scanning with the first contraband detection apparatus, generating a plurality of preliminary risk values, each preliminary risk value corresponding to a particular type of contraband, scanning the container with a second contraband detection apparatus, and based on the preliminary risk values and results of said scanning with the second contraband detection apparatus, generating a plurality of final risk values, each final risk value corresponding to a particular type of contraband.

The invention further provides a system for detecting contraband comprising a contraband detection apparatus to scan a container for contraband and a computer connected to the contraband detection apparatus to generate a personal risk value based information of a person taking the container for loading into a loading bay of a craft and at least a preliminary risk value based on the personal risk value and results of said scanning.

The system may further comprise a second contraband detection apparatus to scan the container for contraband and wherein the computer is further to generate a final risk value based on the preliminary risk value and results of said scanning with the second contraband detection apparatus.

The first contraband detection apparatus may be a CT scanner, and the second contraband detection apparatus may be a QR scanner.

The system may further comprise a transportation subsystem interconnecting the CT scanner and the QR scanner to transport the container between the CT scanner and the QR scanner.

The invention may further provide a system for detecting contraband comprising a first contraband detection apparatus to a perform a first scan on a container for contraband, a second contraband detection apparatus to perform a second scan on the container for contraband, and a computer connected to the first and second detection apparatuses to generate an preliminary risk value on a scale from 1 to 99 percent based on results of the first scan and a final risk value based on the preliminary risk value and results of the second scan.

The invention may further provide a system for detecting contraband comprising a first contraband detection apparatus to perform a first scan on a container for contraband, a second contraband detection apparatus to perform a second scan on the container for contraband, and a computer connected to the first and second detection apparatuses to generate a plurality of preliminary risk values based on results of the first scan, each preliminary risk value corresponding to a particular type of contraband, and a plurality of final risk values based on the preliminary risk values and results of the second scan, each final risk value corresponding to a particular type of contraband.

The invention may further provide a system for detecting contraband in a container comprising a risk assessment agent that accept as input data a plurality of risk values, each risk value indicative of the presence of a respective type of contraband, said risk assessment agents modifying the risk values, based on its own risk assessment applying an empirical or expert based quantification of its risk assessment within a specified risk calculus and said agent outputting the said modified risk values.

The risk assessment agent may be virtual agent residing outside of a physical risk assessment unit. The risk assessment agent may incorporate sensor data for a container. The risk assessment agent may be embedded in a contraband detection apparatus scanning the container. The risk assessment agent may apply an assessment of the general threat state.

The risk assessment agent may be a passenger profiling screening system assessing the relative risk of individuals, to whom the container belongs.

The risk values may be probabilities, with values between 0 and 1. The sum of the probabilities of each threat category and the probability of no threat may be 1.

The risk calculus may be Bayesian probability, and the likelihood of the observation given to the various threat categories is used.

Multiple risk assessment agents may be combined in a series, each using the previous agent's risk value output as risk value input. The system may provide decentralized data fusion.

A decision to alarm or not may be based on the output threat values. A decision whether to send the container to another risk assessment agent may be based on the output threat state. The decision whether to alarm or not may be based on whether the sum of the risk values exceeds a threshold.

The contraband detection apparatus may be a CT scanner or a QR scanner.

BRIEF DESCRIPTION OF THE DRAWINGS

The invention is described by way of example with reference to the accompanying drawings, wherein:

FIG. 3 is a table illustrating the use of the database;

DETAILED DESCRIPTION OF THE INVENTION

Figure 1:
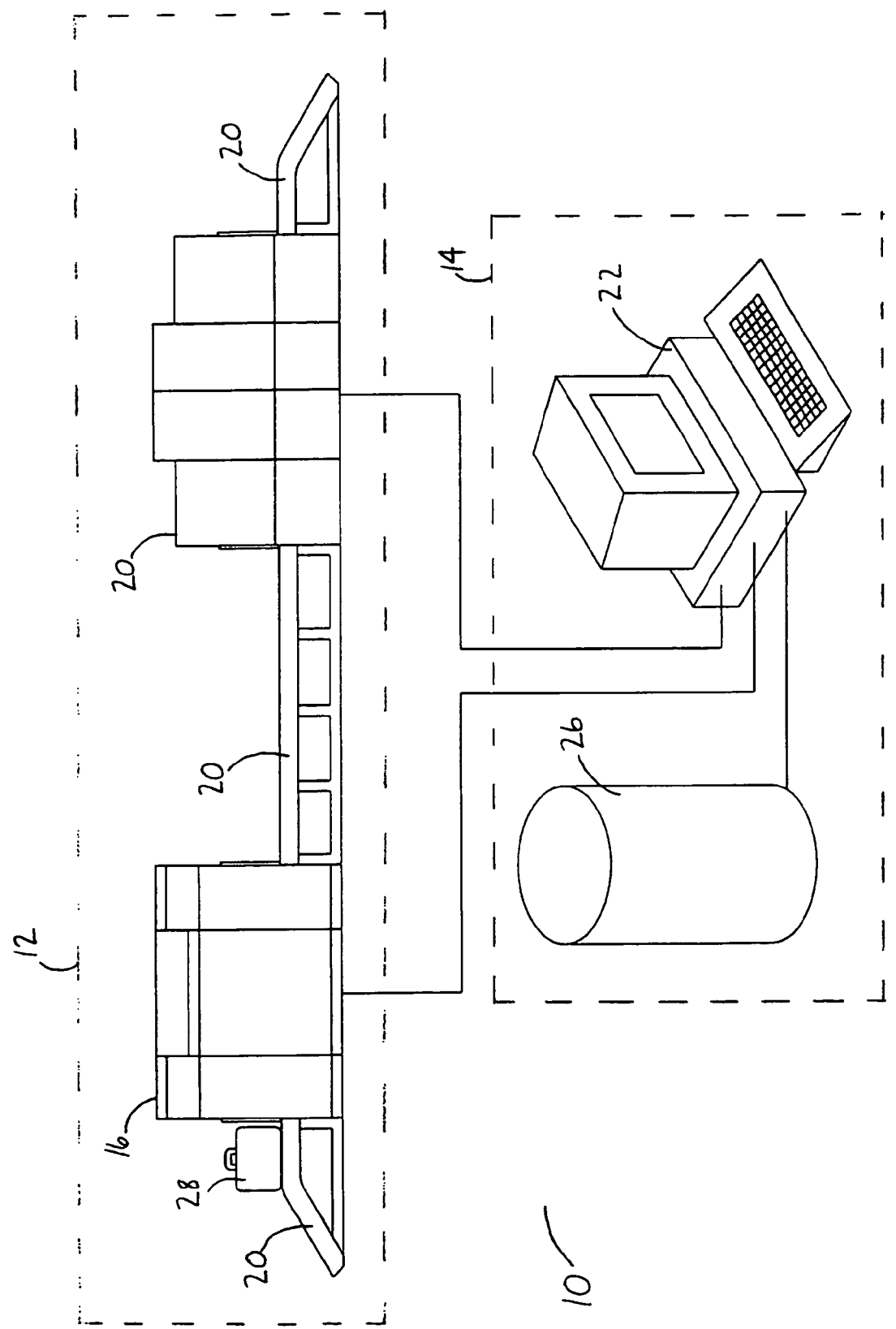
FIG. 1 is a schematic of a contraband detection system, including a scanning subsystem and a computer subsystem, including a database.

FIG. 1 illustrates a contraband detection system 10, or EDS, including a scanning subsystem 12 and a computer subsystem 14.

The scanning subsystem 12 includes a first contraband detection apparatus 16, a second contraband detection apparatus 18, and a conveyor belt 20.

The first contraband detection apparatus 16, or EDS, is a CT scanner (hereinafter referred to as "CT scanner 16"). Although not illustrated in detail, the CT scanner 16 includes a gantry support with a tubular passageway therethrough and a gantry mounted to the gantry support to rotated around the passageway. An X-ray source and X-ray detectors are secured to diametrically opposing sides of the gantry. The tubular passageway is sized appropriately to allow various cargo containers, such as suitcases and other types of luggage, to pass though the CT scanner 16.

The second contraband detection apparatus 18 is a QR scanner (hereinafter referred to as "QR scanner 18"). Although not shown in detail, the QR scanner 18 has a structure that is similar to CT scanner 16 and has a tubular passageway, similar in size to the passageway on the CT scanner 16, therethrough, however, the components include a quadrupole resonance transmitter and a receiver. It is not necessary for the components of to be moveable within the QR scanner 18, but the components must be directed towards the passageway through the QR scanner 18.

The conveyor belt 20 interconnects the CT scanner 16 and QR scanner 18 contraband detection apparatuses and passes through the passageways on both the CT scanner 16 and the QR scanner 18.

Figure 2:
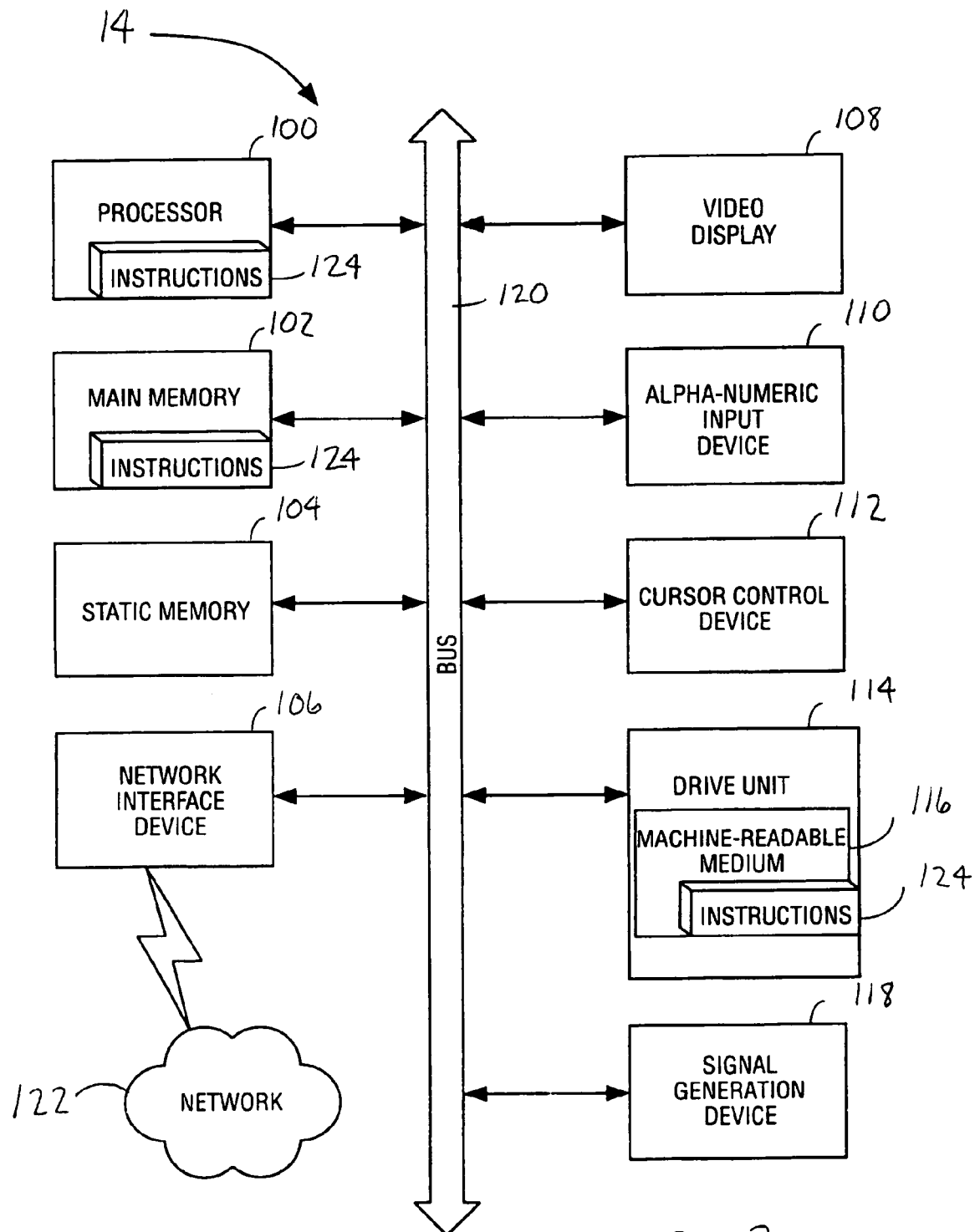
FIG. 2 is a schematic of the computer subsystem.

Referring to FIGS. 1 and 2, the computer subsystem 14 includes a computer 22, and an electronic database 26, which is connected to the computer 22. The computer 22 includes a processor 100, a main memory 102, a static memory 104, a network interface device 106, a video display 108, an alpha-numeric input device 110, a cursor control device 112, a drive unit 114 including a machine-readable medium 116, and a signal generation device 118. All of the components of the computer subsystem 14 are interconnected by a bus 120. The computer subsystem is connected to a network 122 through the network interface device 106. Although illustrated as containing both the database 26 and the static memory 104 within the computer 22, the computer subsystem 14 may only contain one or the other.

The machine-readable medium 116 includes a set of instructions 124, which may be partially transferred to the processor 100 and the main memory 102 through the bus 120. Although not illustrated, the processor 100 and the main memory 102 may also have separate internal sets of instructions.

As illustrated in FIG. 3, the database 26, and/or the static memory 104, includes a list of characteristics about various types of people, such as credit card information, nationality, and whether or not they have a one way airline ticket, and a list of corresponding risk levels or threat states. The risk values may be expressed as numerical probability scales with upper and lower limits such as probabilities from 0 to 1, or 0.01 to 0.99, or percentages from 0 to 100 percent, or 1 to 99 percent (or any ranges in between such as 2 to 98 percent or 0.02 to 0.98). The risk values are associated with each type of person and the likelihood of that person attempting to carry an explosive device, or other contraband, onto the plane.

The computer 22 is connected to both the CT scanner 16 and the QR scanner 18 and is programmed with a Threat State Propagation (TSP) protocol common to both types of scanners. The TSP protocol is an embodiment of the described invention. Although not illustrated, it should be understood that the system 10 also includes an alarm that is connected to the computer 22.

The TSP protocol allows the system 10 to decide whether or not any given bag contains contraband, such as bomb, and trigger the alarm, or simply clear the bag for passage.

The case that a bag contains an explosive device of category i, i=1, ... n is denoted $B_i$, and the case that it does not contain any contraband $B_0$. The event of an alarm is denoted as $A_1$, and the event of a clear $A_0$. The probability of detection, Pd, and the probability of false alarm, Pfa, can be written as conditional probabilities:

$$Pd_i = P(A_1|B_i)$$

$$Pfa = P(A_1|B_0) \qquad (1)$$

The probabilities in Eq. 1 describe the expected machine decision when only the underlying truth, whether or not there is actually a bomb in the bag, is known. These probabilities are also called likelihoods.

In a real-life operational situation, the truth is not known but the machine decision is known. To quantify the probability that a bag has a bomb given the system 10 decision (alarm or clear), Bayes' rule can be used:

$$P(B_i|A_j) = \frac{P(A_j|B_i)P(B_i)}{P(A_j|B_1)P(B_1) + P(A_j|B_2)P(B_2) + \ldots + P(A_j|B_n)P(B_n) + P(A_j|B_0)P(B_0)} \qquad (2)$$

for $j = 0, 1$
$i = 0, \ldots, n$

The expressions in Eq. (2) represent the probability of a explosive category given an alarm (j=1) and given a clear (j=0). Thus, it quantifies the relative certainty of the presence of a bomb when the system 10 output is given.

These probabilities depend on quantities of the particular system used (Pd, Pfa) and on the so-called priors, which are $P(B_i)$ and $$P(B_0) = 1 - \sum_{i=1}^{n} P(B_i).$$

Prior probabilities are fundamental in Bayesian statistics, and will be discussed in more detail in a later section. The prior probabilities are assigned before screening a bag.

Conveniently, the computed probabilities (P(B|A) etc.) from one system can act as the prior probabilities (P(B), etc.) for a second system. This is true when the two systems are conditionally independent. An additional assumption is that a bag can only contain one explosive type, i.e. $B_1$ and $B_2$ are mutually exclusive. However, the probability of B1 and B2 can both be high, but the sum of B1 and B2 can not exceed 1, or 100 percent.

When the EDS output is generalized from $A_1$ and $A_0$ to any output (X), which can be a binary variable (alarm or clear), a set of such variables, a continuous number, a set of continuous numbers, or a mix of all of them, Eq. (3) takes the following form:

$$P(B_i|X) = \frac{P(X|B_i)P(B_i)}{P(X|B_1)P(B_1) + P(X|B_2)P(B_2) + \ldots + P(X|B_n)P(B_n) + P(X|B_0)P(B_0)} \quad (3)$$

A threat state is defined as the array of probabilities, $P(B_1), P(B_2), \ldots, P(B_n)$. $P(B_0)$ is omitted since it can be computed from the other components, i.e. $P(B_0)=1-(P(B_1)+P(B_2)+\ldots+P(B_n))$. The Bayesian prior forms the initial threat state, i.e. the threat state before the bag has been screened by any EDS. Each EDS modifies the threat state according to its scan results (X), historical data, or likelihood, ($P(X|B_i)$), and the input threat state ($P(B_i)$). Thus, $P(B_i|X)$ is the threat state after modification by an EDS.

Figure 4A:
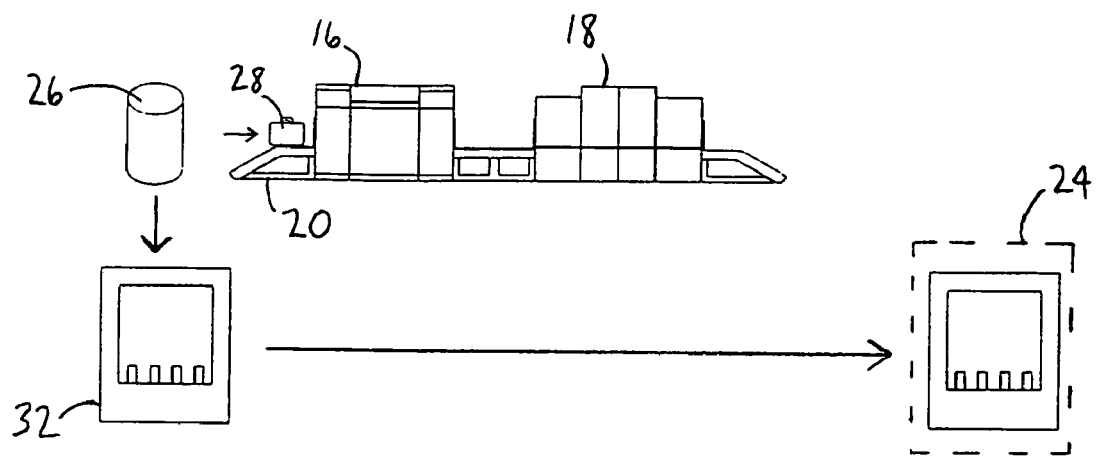
FIGS. 4A-4C are schematics of the contraband detection system, illustrating generation of a prior threat state before a container enters the scanning subsystem (FIG. 4A) and modification of the threat state as the container passes through the scanning subsystem (FIGS. 4B and 4C)
Figure 4B:
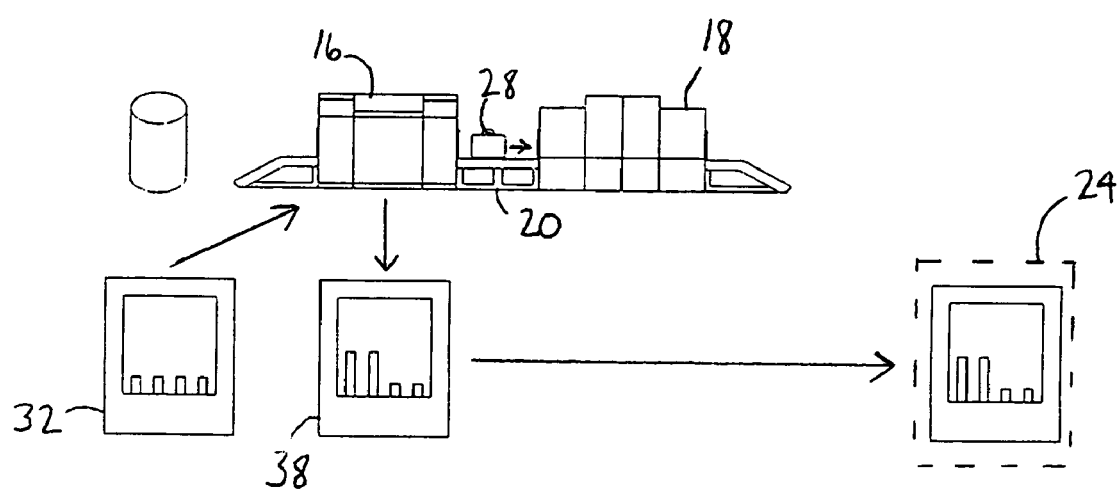
Figure 4C:
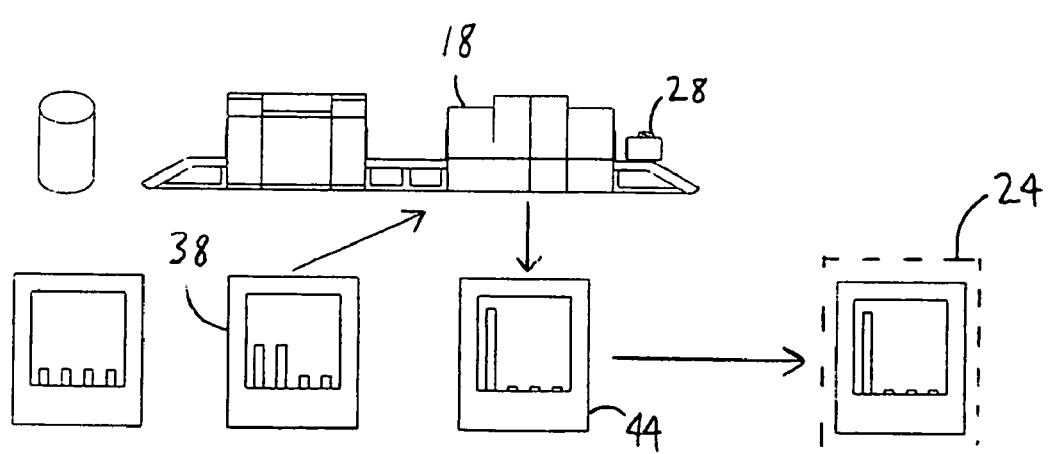

For multiple EDSs operating in series the output threat state for one EDS is given as the input threat state for the next EDS downstream. The threat state thus propagates through the systems accumulating information from each EDS, as illustrated in FIGS. 4A-4C.

Prior threat assessments, either per threat scenario (threat alert level) or per-passenger (Computer Assisted Passenger Prescreening System (CAPPS)), can be implemented as a meta TSP EDS according to Eq. (4).

For each bag, the system makes a binary decision: Alert or Clear. In the TSP protocol this decision is based on the output threat state. It is based on whether the combined probability of contraband i.e., $P(B_1|X)+P(B_2|X)+\ldots+P(B_n|X)$, exceeds a pre-determined threshold, or critical probability ($P_{crit}$).

There may be particular types of explosives that an EDD are not able to detect. To fill in any possible gaps, the TSP adds a checklist to the threat state. The checklist has one entry per explosive category and is propagated through the system along with the threat state. If one or more entries (types of explosives) are left unchecked, the system will trigger the alarm, no matter what the threat state is. The checklist can be defined as:

$$C_i = \begin{cases} 1 & \text{if screened for } B_i \\ 0 & \text{otherwise} \end{cases} \quad (5)$$

Thus, the EDS decision can further be defined as:

$$EDS \text{ decision} = \begin{cases} \text{Alert if } \sum_{i=1}^{n} P(B_i) > P_{crit} \cup \sum_{i=1}^{n} C_i < n \\ \text{Clear} \quad \text{otherwise} \end{cases} \quad (4)$$

The sensitivity of an EDS may thus be adjusted in two ways: by changing the prior threat state or by changing the critical probability.

Figure 5:
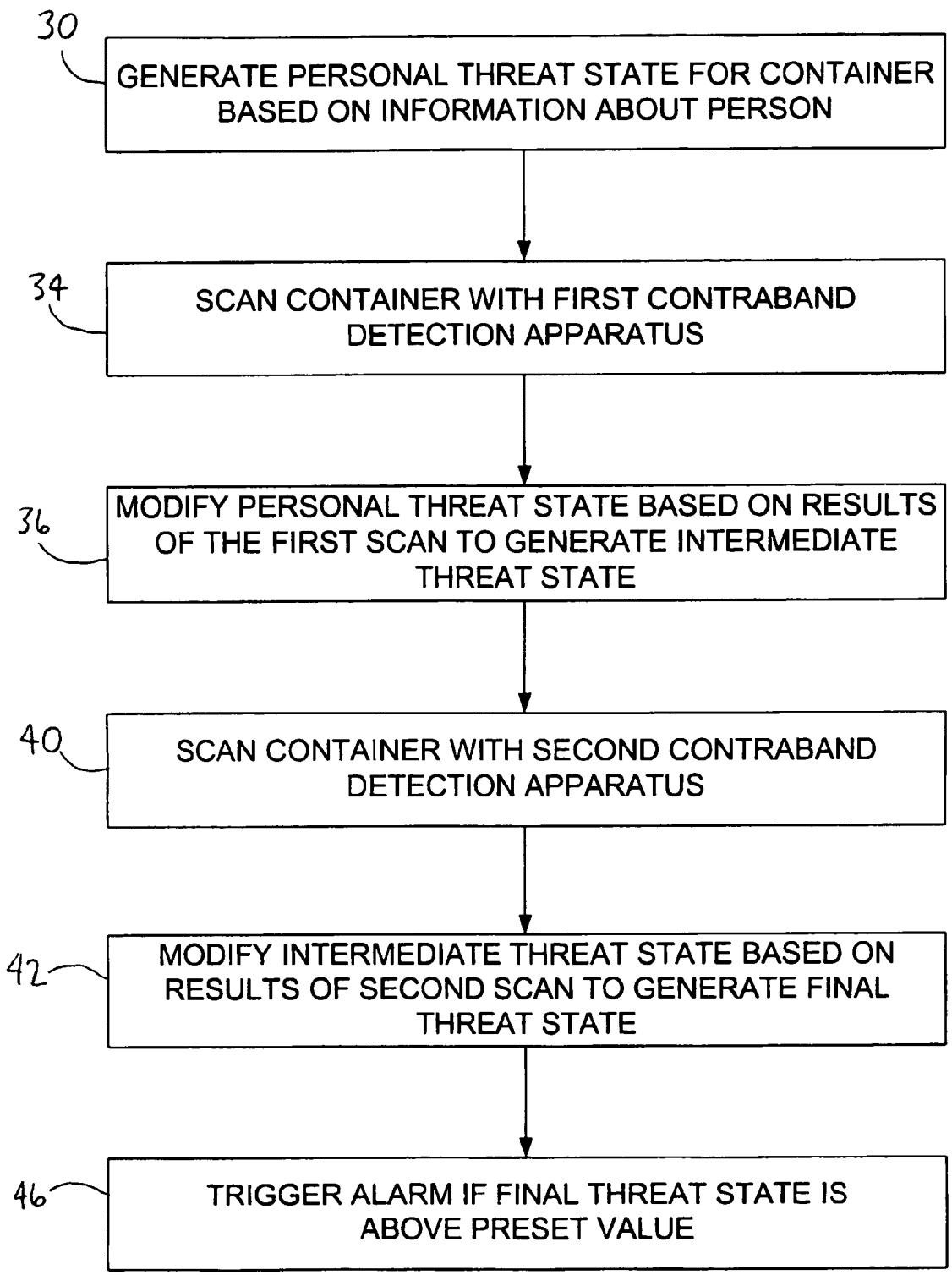
FIG. 5 is a flow chart illustrating use of the contraband detection system.

In use, the container or bag 28 is placed on the conveyor belt 20. Referring to FIGS. 3, 4A and 5, a personal threat state 32 is first generated (step 30). Before the bag 28 is scanned by the CT scanner 16, information about a person, such as a person taking the bag 28 for loading, is entered into the computer 22 through the alpha-numeric input device 110 and the cursor control device 112. Depending on the information entered, the instructions 124 are sent to the processor 100 and the main memory 124 and fed into the database 26 as an input 126. The computer 22 retrieves various information from the database 26 and/or static memory 104. Based on the output information 128 received from the database 26, the computer 22 generates the personal threat state 32, which includes probabilities that the person will be carrying one of a number, such as four, types of contraband, such as an explosive device, in their bag 28. As illustrated in FIG. 4A, the personal threat state 32 is displayed on the display device 108 of the computer 22.

The bag 28 is then moved along the conveyor belt 20 into the CT scanner 16 (step 34). While the bag 28 is within the passageway, the gantry rotates the X-ray source and detector units around the bag 28 so that multiple projections of the bag 28 may be taken at various angles. X-rays emitted from the source pass through the bag and are detected by the detector units. Each image the CT creates represents the mass and density of a two dimensional "slice" of the bag.

As illustrated in FIG. 4B, the personal threat state 32 is sent to the CT scanner 16 which, after making its observations, modifies the personal threat state 32 to generate an intermediate, or preliminary, threat state 38 (step 36). The intermediate threat state includes modified probabilities that the bag 28 includes the various types of contraband that were included in the personal threat state 32. Because of the various detections made by the CT scanner 16, the probability for each type of contraband has likely been changed. The intermediate threat state 38 is displayed on the display device 108 of the computer 22.

The conveyor belt 20 then moves the bag 28 into the QR scanner 18, which scans the bag 28 (step 40). As illustrated in FIG. 4C, the intermediate threat state 38 is sent to the QR scanner which, based on various detections made, modifies the intermediate threat state 38 to generate a final threat state 44 (step 42). The final threat state 44 includes a plurality of further modified probabilities that the bag 28 includes one of the various types of contraband included in the intermediate 38 and personal 32 threat states. The final threat state 44 is displayed on the display device 108 of the computer 22.

The computer 22 reads the final threat state 44, and if the total probability of any type of contraband being in the bag 28 is above the critical probability, the computer 22 triggers the alarm to alert the user of the system 10, as described in Eq. (6) (step 46).

One advantage is that because the EDDs communicate through a common protocol, a tailored data fusion algorithm is not required. Another advantage is that intimate knowledge of the individual EDDs and/or EDSs, which may be made by different manufacturers, is not required in order to use the system. A further advantage is that because a prior threat state is incorporated before the bag is scanned with an EDS, a more accurate contraband detection system is provided. A further advantage is that the system categorizes the threat states for different types of explosives. A further advantage is that the sensitivity of the system is easily adjusted by changing the critical probability or by altering the prior threat state through incorporating passenger profiling information or threat alert state information.

Figure 6:
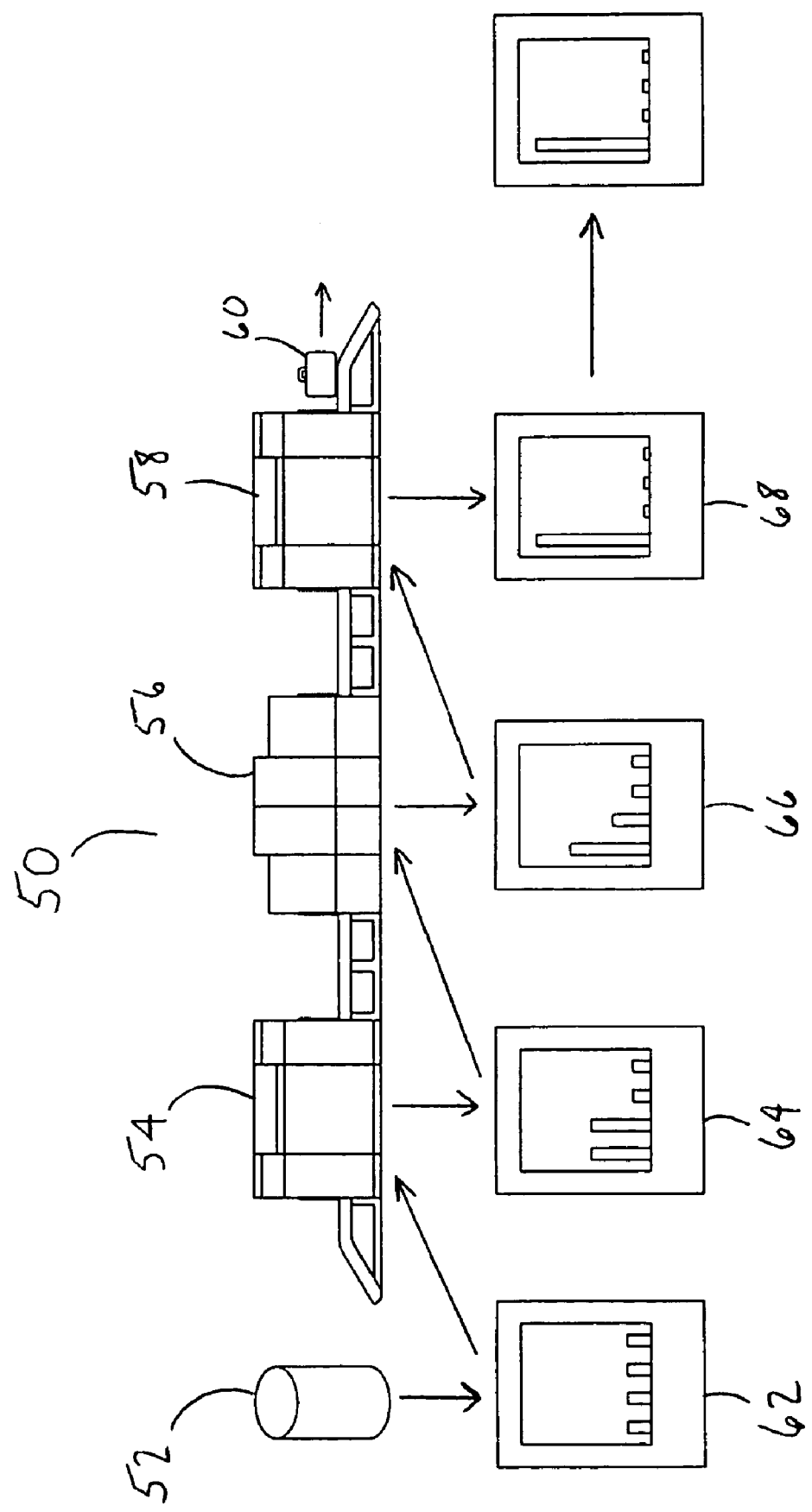
FIG. 6 is a schematic of a scanning subsystem.

FIG. 6 illustrates a contraband detection system 50 according to another embodiment of the present invention. The contraband detection system 50 may include component similar those of the system 10 illustrated in FIG. 1. Referring to FIG. 6, the contraband detection system 50 includes a database 52, a first contraband detection apparatus 54, a second contraband detection apparatus 56, and a third contraband detection apparatus 58. In the embodiment illustrated in FIG. 6, the first contraband detection apparatus 54 is a CT scanner (hereinafter referred to as "CT scanner 54"), the second contraband detection apparatus 56 is a QR scanner (hereinafter referred to as "QR scanner 56"), and the third contraband detection apparatus 58 is an x-ray diffraction (XRD) scanner (hereinafter referred to as "XRD scanner 58").

Although not illustrated, it should be understood that the contraband detection system 50 may also include a computer similar to the one illustrated in FIG. 1.

In use, referring to FIG. 6, a bag 60 is placed within the system 50. Before the bag is scanned with the CT scanner 54, a personal threat state 62 is generated based on information about the carrier of the bag 60 and information retrieved from the database 52 or the computer. When the bag 60 is scanned by the CT scanner 54, a preliminary threat state 64 is generated, such as by modifying the personal threat state 62. The bag 60 is then scanned by the QR scanner 56, and an intermediate threat state 66 is generated, such as by modifying the preliminary threat state 64. After the bag 60 is scanned by the XRD scanner 58, a final threat state 68 is generated, such as by modifying the intermediate threat state.

The XRD scanner 58, as is commonly understood in the art, includes an x-ray source and an x-ray detector. X-rays are sent from the x-ray source through the bag 60 into the detector, which measures the elastic or coherent scatter spectra of the x-rays after passing through the bag 60. The computer may include a library of known reference spectra for various dangerous substances and compare them to the detected spectra.

It should be understood that the generating of the various threat state, or modification of the threat states, is performed by the computer, in a similar fashion to the system 10 illustrated in FIG. 1.

An advantage of the system 50 illustrated in FIG. 6 is that the accuracy of detecting contraband is even further increased.

Other embodiments may use different types if contraband detection apparatuses besides CT, QR, and XRD scanners. For example, an Advanced Technology (AT) hardware scanner, as is commonly understood in the art, may also be used. An AT scanner may include two x-ray systems with two different views of the suspect object (e.g., the bag). The two images created from these views are combined into what is known as a "three-dimensional density reconstruction." The estimated material density is compared to typical density data for explosive materials. An AT scanner may also include a dual energy explosive detection system to further estimate the density of the objects in the bag. Two different x-ray images are created using two different x-ray voltages. Dedicated image processing is used to separate different objects superimposed on one another in the projected image. The estimated densities are compared to typical density data for explosive materials.

Additionally, as another example, a trace detector, as is commonly understood in the art, could also be used. A trace detector essentially "sniffs" an object to determine its composition. A trace detector includes a collector mechanism that traps vapor and particles from the subject object (e.g., the bag). The collected particles are then analyzed to determine the composition of the object.

The various types of scanners, or detection apparatuses, (e.g., CT, QR, XRD, AT, and trace detectors) can be arranged in the explosive detection system in any order, in any combination (e.g., an XRD, a QR, and a trace). More than three detection apparatuses may be linked to use the method described above. The detection apparatuses may be used to detect other types of contraband, such as narcotics. After the personal threat state is generated, the bag may be scanned with only one contraband detection apparatus. The personal threat state may be generated without using information about the particular individual and may simply be a generic personal threat state. The contraband detection apparatuses may not be directly physically or electrically connected, and the scans by each contraband detection apparatuses may not take place immediately after one another.

In the cases where the contraband detection apparatus is an imaging system, such as a CT scanner, the system may be able to locate threat items, or regions, within the item being scanned (i.e., the bag). There may be multiple distinct threat regions within the bag. In these cases, the local regions within the bag may each have an associated threat state. The bag will thus have several local threat states and a global threat state. The global threat state is valid for the entire bag and is consistent with the local threat states.

There may thus be a hierarchy of threat states consisting of local threat states within global threat states. This hierarchy of threat states may be passed between systems. The calculus for the local threat states is the same as it is for the global threat states. The global threat state may be computed from multiple local threat states by assuming statistical independence between the different threat regions.

An additional advantage of this hierarchy of threat states is that the "resolution" of the threat is increased. This resolution is further increased because if the bag is scanned by multiple imaging systems, the second system can modify the local threat states reported by the first system.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of detecting contraband, comprising:
scanning a container with a first type of contraband detection apparatus;
based on results of said scanning with the first type of contraband detection apparatus, generating a plurality of preliminary risk values, each preliminary risk value indicative of a presence of a respective type of contraband;
scanning the container with a second type of contraband detection apparatus; and
based on results of said scanning with the second type of contraband detection apparatus, modifying the preliminary risk values to generate a plurality of final risk values, each final risk value corresponding to a respective one of the preliminary risk values and indicative of the presence of the respective type of contraband.

2. The method of claim 1, wherein the preliminary risk values are on a numerical probability scale having a lower limit and an upper limit between 0 and 100 percent.

3. The method of claim 2, further comprising: entering information of a person taking the container for loading into a loading bay of a craft; and based on the information, generating a personal risk value, said generating of the plurality of preliminary risk values being based on the personal risk value and the results of said scanning with the first type of contraband detection apparatus.

4. The method of claim 3, further comprising triggering an alarm based on at least one of the final risk values.

5. The method of claim 4, wherein the first type of contraband detection apparatus is a CT scanner.

6. The method of claim 5, wherein the second type of contraband detection apparatus is a QR scanner.

7. The method of claim 6, wherein said scanning with the CT scanner takes place before said scanning with the QR scanner.

8. The method of claim 1, further comprising scanning the container with a third type of contraband detection apparatus and based on results of said scanning with the third type of contraband detection apparatus, generating a plurality of intermediate risk values, said generating of the plurality of final risk values being further based on said scanning of the container with a third type of contraband detection apparatus and the intermediate risk values.

9. The method of claim 8, wherein the first type of contraband detection apparatus is a CT scanner, the second type of contraband detection apparatus is a QR scanner, and the third type of contraband detection apparatus is a XRD scanner.

10. A method of detecting contraband, comprising:
entering information about a person taking a container for loading;
based on the entered information, generating a personal risk value;
scanning the container with a first contraband detection apparatus; and
based on the personal risk value and results of said scanning, generating at least a preliminary risk value.

11. The method of claim 10, further comprising scanning the container with a second contraband detection apparatus and based on the preliminary risk value and results of said scanning with the second contraband detection apparatus, generating an intermediate threat state.

12. The method of claim 11, further comprising scanning the container with a third contraband detection apparatus and based on the intermediate threat state and results of said scanning with the third contraband detection apparatus, generating a final threat state.

13. A method of detecting contraband, comprising:
scanning a container with a first contraband detection apparatus;
based on results of said scanning with the first contraband detection apparatus, generating an preliminary risk value on a numerical probability scale having a lower limit and an upper limit between 0 and 100 percent;
scanning the container with a second contraband detection apparatus; and
based on the preliminary risk value and results of said scanning with the second contraband detection apparatus, generating a final risk value.

14. The method of claim 13, further comprising scanning the container with a third contraband detection apparatus and based on results of said scanning with the third type of contraband detection apparatus, generating an intermediate risk value, said generating of the final risk value being further based on results of said scanning of the container with the third contraband detection apparatus and the intermediate risk value.

15. A method of detecting contraband, comprising:
scanning a container with a first contraband detection apparatus;
based on results of said scanning with the first contraband detection apparatus, generating a plurality of preliminary risk values, each preliminary risk value corresponding to a particular type of contraband;
scanning the container with a second contraband detection apparatus; and
based on the preliminary risk values and results of said scanning with the second contraband detection apparatus, generating a plurality of final risk values, each final risk value corresponding to a particular type of contraband.

16. The method of claim 15, further comprising:
scanning the container with a third contraband detection apparatus and based on results of said scanning with the third type of contraband detection apparatus, generating a plurality of intermediate risk values, said generating of the plurality of final risk values being further based on results of said scanning of the container with the third contraband detection apparatus and the intermediate risk values.

17. A contraband detection system, comprising:
a contraband detection apparatus to scan a container for contraband; and
a computer connected to the contraband detection apparatus to generate a personal risk value based on information about a person taking the container for loading and at least a preliminary risk value based on the personal risk value and results of said scanning.

18. The system of claim 17, further comprising a second contraband detection apparatus to scan the container for contraband and wherein the computer is further to generate an intermediate risk value based on the preliminary risk value and results of said scanning with the second contraband detection apparatus.

19. The system of claim 18, further comprising a third contraband detection apparatus to scan the container for contraband and wherein the computer is further to generate an intermediate risk value based on the preliminary risk value and results of said scanning with the third contraband detection apparatus.

20. A contraband detection systems comprising:
a first contraband detection apparatus to perform a first scan on a container for contraband;
a second contraband detection apparatus to perform a second scan on the container for contraband; and
a computer connected to the first and second detection apparatuses to generate a plurality of preliminary risk values based on results of the first scan, each preliminary risk value corresponding to a particular type of contraband, and a plurality of final risk values based on the preliminary risk values and results of the second scan, each final risk value corresponding to a particular type of contraband.

21. The system of claim 20, wherein the preliminary risk values are on a numerical probability scale having a lower limit and an upper limit between 0 and 100 percent.

22. The system of claim 21, wherein the computer is further to generate a plurality of personal risk values based information of a person taking the container for loading into a loading bay of a craft and the preliminary risk values are further based on the personal risk value and results of said scanning.

23. The system of claim 22, further comprising an alarm and wherein the computer triggers the alarm if at least one of the final risk values exceeds a predetermined amount.

24. The system of claim 23, wherein the first type of contraband detection apparatus is a CT scanner.

25. The system of claim 24, wherein the second type of contraband detection apparatus is a QR scanner.

26. The system of claim 25, wherein said scanning with the CT scanner takes place before said scanning with the QR scanner.

27. The system of claim 20, further comprising a third contraband detection apparatus to perform a third scan on the container for contraband, wherein the computer is further to generate a plurality of intermediate risk values based on the results of the first scan and the preliminary risk values, and wherein the final risk values are further based on the intermediate risk values.

28. The system of claim 27, wherein the first type of contraband detection apparatus is a CT scanner, the second type of contraband detection apparatus is a QR scanner, and the third type of contraband detection apparatus is a trace detector.

* * * * *